United States Patent [19]
O'Bryan et al.

[11] Patent Number: 6,086,075
[45] Date of Patent: Jul. 11, 2000

[54] STEERING LINKAGE ARRANGEMENT FOR A MOTOR VEHICLE

[75] Inventors: Timothy S. O'Bryan, Sterling Heights; Wilbert W. Williams, West Bloomfield; Christopher J. Nowak, Bloomfield, all of Mich.

[73] Assignee: DaimlerChrysler Corporation, Auburn Hills, Mich.

[21] Appl. No.: 09/282,639

[22] Filed: Mar. 31, 1999

[51] Int. Cl.[7] ...................................................... B62D 7/99
[52] U.S. Cl. .................................... 280/89.12; 280/89.13
[58] Field of Search ............................... 280/89.1, 89.11, 280/89.12, 89.13

[56] References Cited

U.S. PATENT DOCUMENTS

| | | | |
|---|---|---|---|
| 3,420,542 | 1/1969 | Jordan, Jr. ............................... | 280/89.1 |
| 4,279,428 | 7/1981 | Onodera ................................ | 280/89.12 |
| 4,406,473 | 9/1983 | Sexton .................................. | 280/89.11 |
| 4,697,817 | 10/1987 | Jefferson .............................. | 280/89.12 |
| 4,761,019 | 8/1988 | Dubensky . | |
| 4,822,012 | 4/1989 | Sketo ................................... | 280/89.11 |
| 5,782,484 | 7/1998 | Kuhn, Jr. . | |

OTHER PUBLICATIONS

1999 Ram Truck 1500–3500 Service Manual, pp. 19–27 through 19–29, copyright 1998.

*Primary Examiner*—Kenneth R. Rice
*Attorney, Agent, or Firm*—Marc Lorelli

[57] ABSTRACT

A steering linkage arrangement for a motor vehicle includes an axle assembly, a tie rod assembly and a steering damper. The tie rod assembly includes a tubular member. The steering damper has a first end connected to the axle assembly and a second end connected to a mounting member. The tubular member is integrally formed to include a portion for positively locating the mounting member along the length of the tubular member.

7 Claims, 5 Drawing Sheets

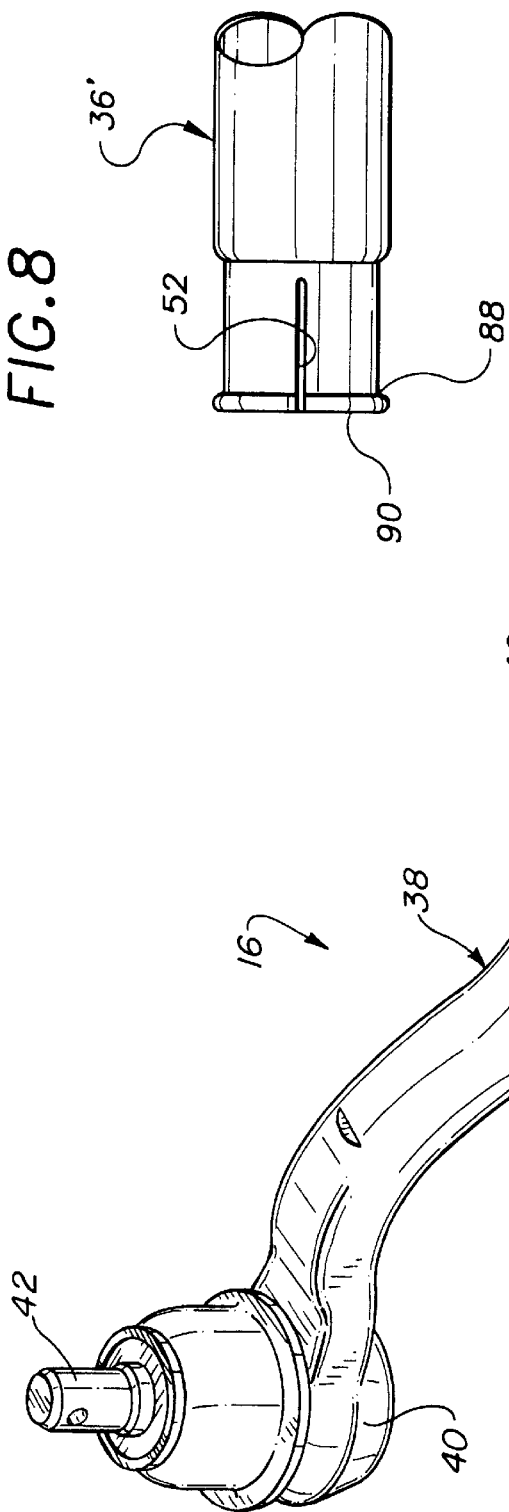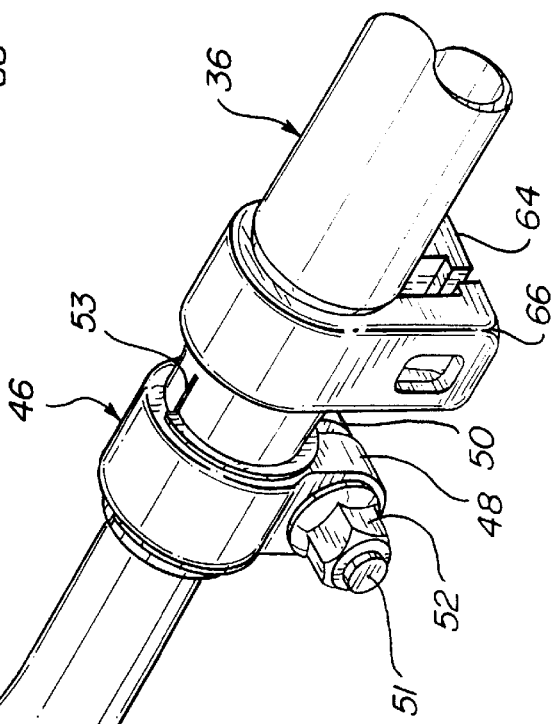

STEERING LINKAGE ARRANGEMENT FOR A MOTOR VEHICLE

BACKGROUND OF THE INVENTION

1. Technical Field

The present invention generally relates to motor vehicles. More particularly, the present invention relates to a steering linkage arrangement for a motor vehicle. More specifically, but without restriction to the particular embodiment and/or use which is shown and described for purposes of illustration, the present invention pertains to a steering damper for a steering linkage arrangement of a motor vehicle and a related method of attaching the steering damper to a tubular component of a tie rod assembly.

2. Discussion

The steering linkages associated with the wheels of modern motor vehicles include tie rod assemblies which connect right hand and left hand steering knuckles so that any given input through a drag link is transferred to both wheels simultaneously without loss of motion. The tie rod assembly typically includes an inner tie rod member and a pair of outer tie rod members. Adjustment of the tie rod assembly controls a toe setting of the vehicle, which refers to a condition in which the front portions of the front wheels are closer together than the rear (toe-out) or the rear portions of the wheels are closer together than the front (toe-in) portions. Accurate toe setting is important to ensure proper handling and normal tire wear.

To reduce the feedback of road input to the steering wheel, it is known to incorporate a steering damper. In one known arrangement previously employed by the assignee of the present application, a steering damper consists of a steel tube shock absorber with a first end mounted to an axle housing and a second end mounted to the tie rod assembly. The portion of the tie rod assembly to which the steering damper is secured is formed of solid steel and includes an aperture for receiving a threaded fastener carried by the steering damper.

While various types of steering linkage arrangements for motor vehicles have been designed to reduce feedback from road input, they are all subject to improvement. In this regard, tubular design for components of a tie rod assembly is desirable for providing greater durability with reduced weight. In a tubular design, conventional mounting techniques for the steering damper cannot be employed. A specific location for steering damper attachment is required to secure packaging space and to protect the defined limits of the steering damper. Typically, connections to tubular designs have been heretofore designed to be assembled in a fixture or slaved to other consistent features to ensure proper location.

Thus, a need remains in the art for an improved method and apparatus for attaching a steering damper to a tubular tie rod component that provides for alignment adjustments without impacting packaging space or compromising damper stroke.

SUMMARY OF THE INVENTION

It is a general object of the present invention to provide an improved steering linkage arrangement for a motor vehicle which overcomes the disadvantages associated with known arrangements, including but not limited to those discussed above.

It is a more specific object of the present invention to provide a steering linkage arrangement including a steering damper having an end secured to a tubular portion of a tie rod assembly.

In one form, the present invention provides a steering linkage arrangement for a motor vehicle. The steering linkage arrangement includes an axle assembly, a tie rod assembly and a steering damper. The tie rod assembly includes a tubular member. The steering damper has a first end connected to the axle assembly and a second end connected to a mounting member. The tubular member is integrally formed to include a portion for positively locating the mounting member along the length of the tubular member.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 4 is a perspective view of the end of the tie rod assembly of FIG. 3.

FIG. 8 illustrates an alternate construction of an end of the inner tie 10 and member of the present invention.

DETAILED DESCRIPTION OF THE PREFERRED EMBODIMENT

Figure 1:
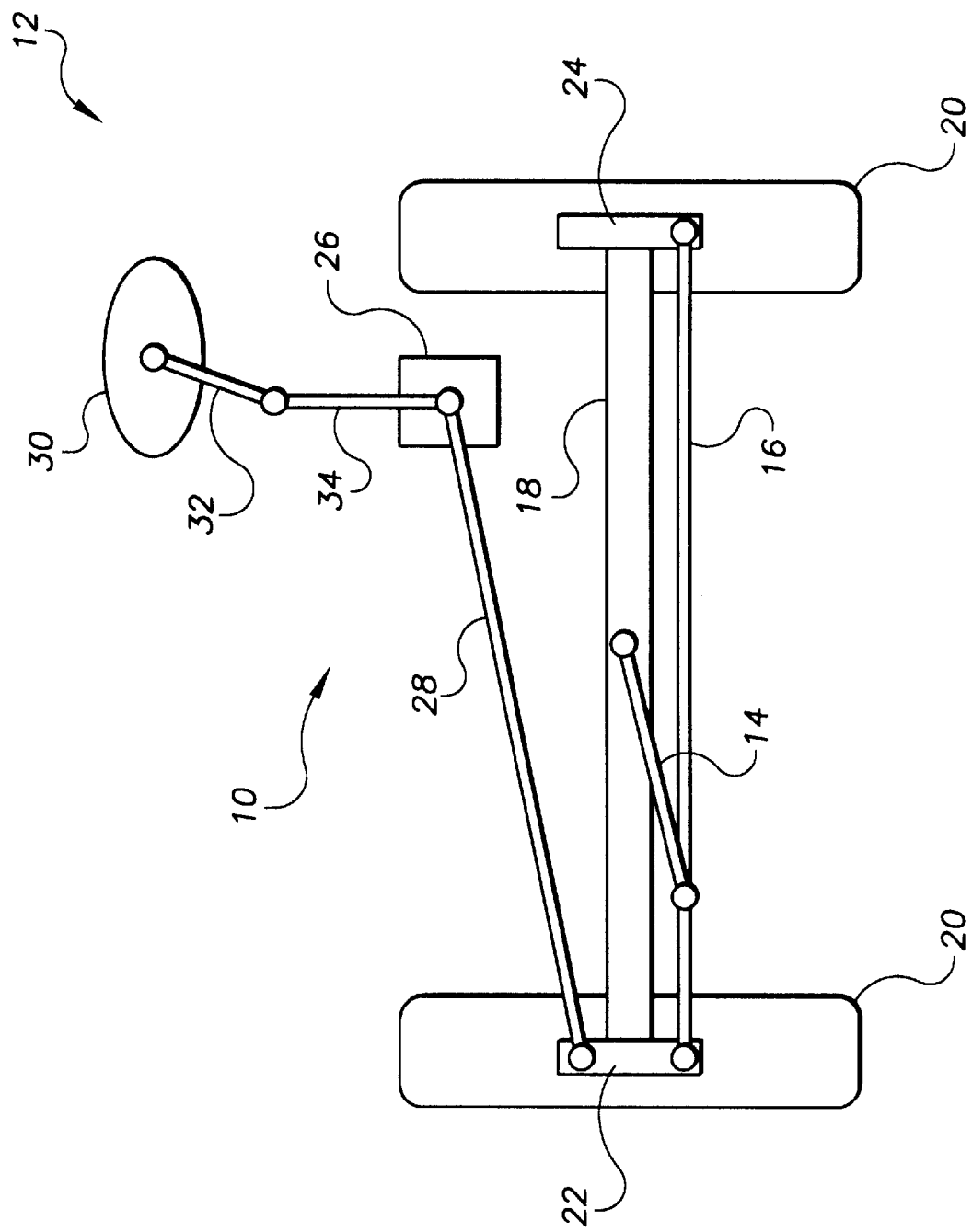
FIG. 1 is a simplified schematic view of a motor vehicle incorporating a steering linkage arrangement constructed in accordance with the teachings of the present invention.
Figure 2:
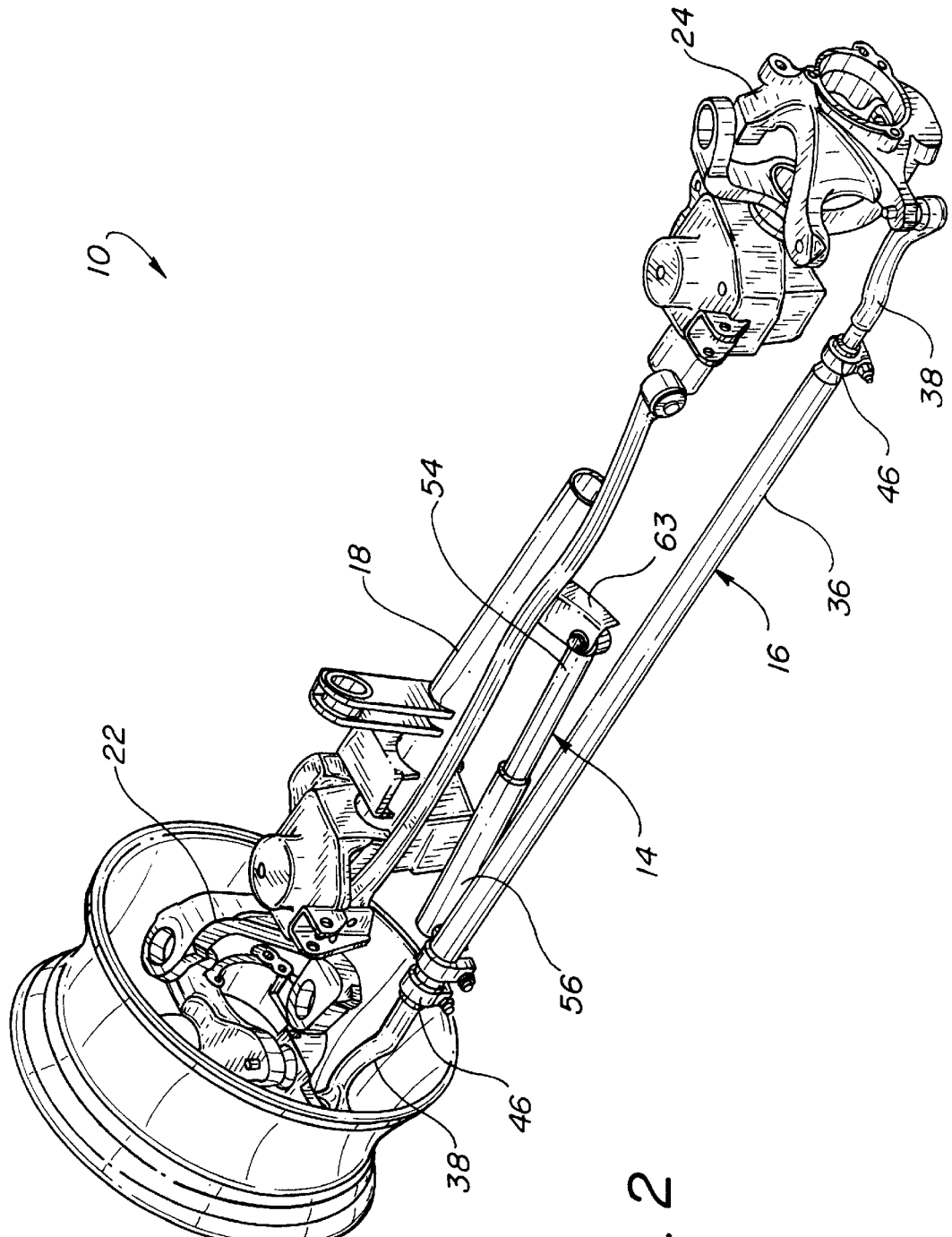
FIG. 2 is an enlarged perspective view of the steering linkage arrangement of the preferred embodiment of the present invention illustrating attachment of the steering damper to the axle assembly and the tie rod assembly.
Figure 3:
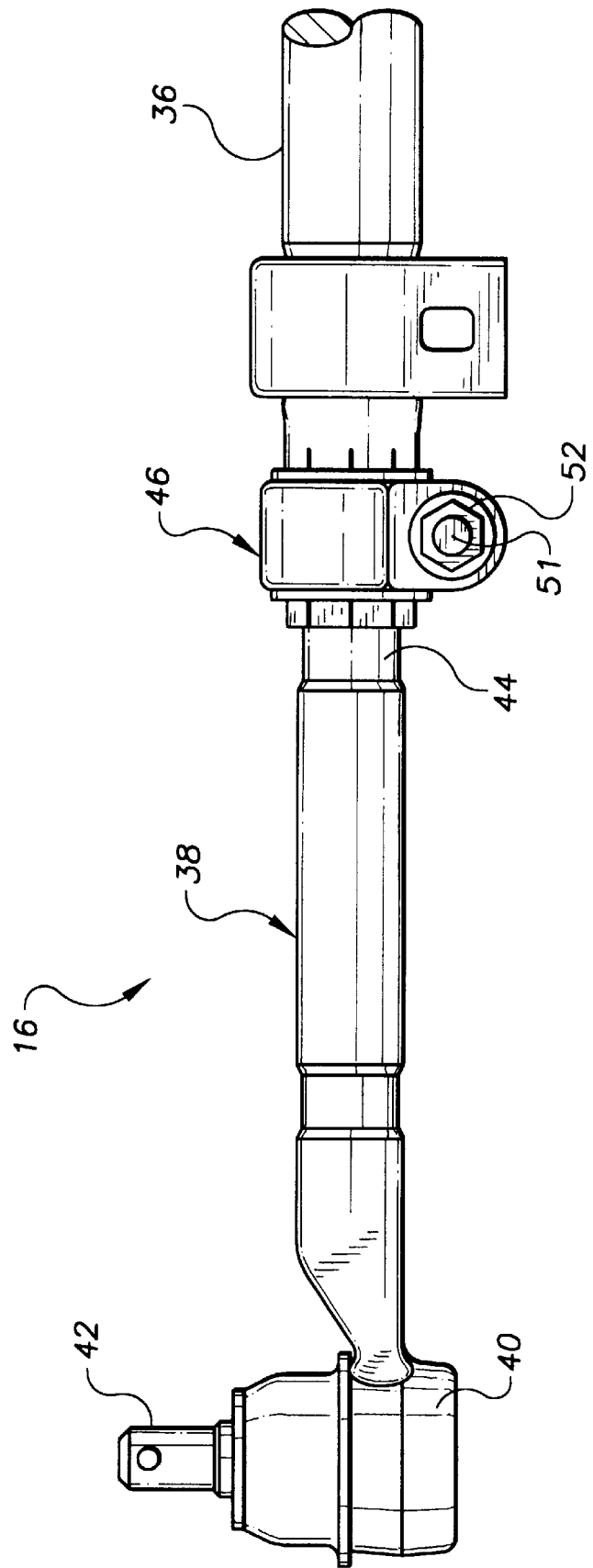
FIG. 3 is an enlarged side view of an end of the tie rod assembly of the steering linkage arrangement of the preferred embodiment of the present invention.
Figure 5:
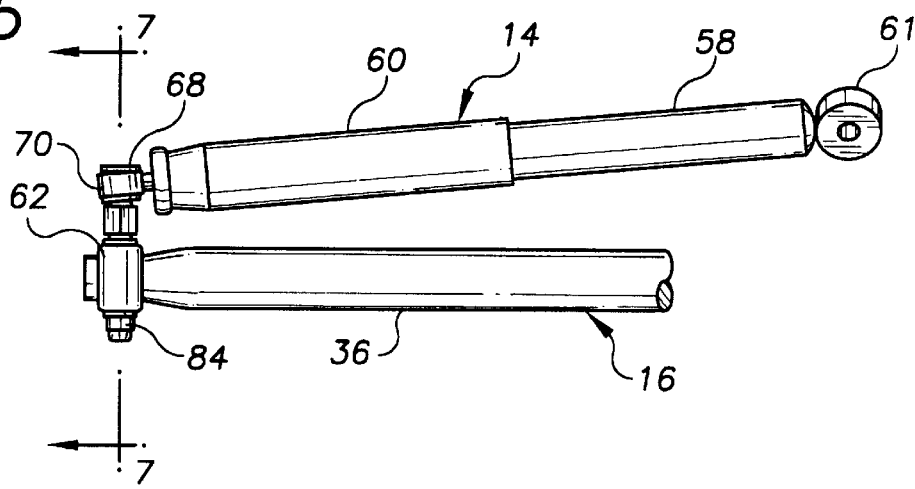
FIG. 5 is a top view of the steering damper and a portion of tie rod assembly of the preferred embodiment of the present invention.
Figure 6:
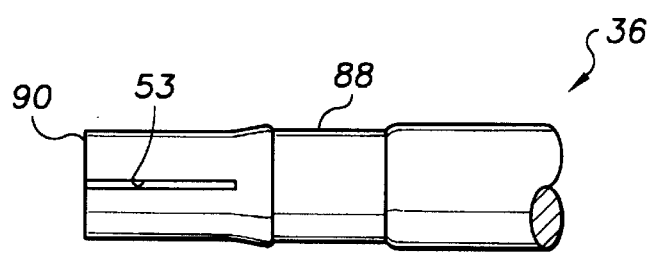
FIG. 6 is an enlarged top view of one end of the inner tie rod member of the preferred embodiment of the present invention.

Referring initially to FIG. 1, a steering linkage arrangement constructed in accordance with the teachings of a preferred embodiment of the present invention is illustrated in simplified schematic form and generally identified with reference numeral 10. The steering linkage arrangement 10 is shown operatively associated with a portion of an exemplary motor vehicle 12. The present invention is particularly directed to a steering damper 14 of the steering linkage arrangement 10 and its manner of attachment to a tie rod assembly 16.

Prior to addressing these aspects of the present invention, a brief understanding of the exemplary environment illustrated throughout the drawings is warranted. With continued reference to the schematic view of FIG. 1, the motor vehicle 12 is shown to further include an axle assembly 18 interconnected to a pair of steered wheels 20 through a right hand knuckle 22 and a left hand knuckle 24. In the embodiment illustrated, the pair of steered driven wheels is a pair of front wheels 20. The right hand knuckle 22 is connected to a steering gear 26 via a pitman arm through a drag link 28. The steering gear 26 is interconnected to a steering wheel 30 through a steering column 32 and an intermediate shaft 34. The tie rod assembly 16 connects the right and left hand steering knuckles 22 and 24 such that steering input through the drag link 28 is transferred to both wheels 20 simultaneously. In a conventional manner, rotary motion of the steering wheel 30 is converted into a turn motion of the vehicle's steered wheels 20.

With continued reference to FIG. 1 and additional reference to FIGS. 2 through 7, the tie rod assembly 16 is illustrated to include an inner tie rod member 36 and a pair of outer tie rod members 38. The outer tie rod members 38 will be understood to be symmetrical forgings and are conventionally attached to an associated one of the steering knuckles 22 and 24. To fully understand the present invention, only the outer tie rod member 38 associated with the right hand knuckle 22 and its attachment to the inner tie rod member 36 need be described. However, it will be understood that the other outer tie rod member 38 is similarly secured to the inner tie rod member 36.

The outer tie rod member 38 includes a first end 40 having a threaded rod 42 which extends generally perpendicular to a longitudinal axis of the tie rod assembly 16. The threaded rod 42 also extends through an aperture (not specifically shown) provided in the associated steering knuckle 22 and is retained with a nut (not shown). The inner tie rod member 36 is preferably tubular in construction. A second end 44 of the outer tie rod member 38 is telescopically received by the inner tie rod member 36.

While not particularly shown, it will be understood that the second ends 44 of the outer tie rod members 38 may be externally threaded in certain applications. In such applications, the external threads meshingly engage internal threads of the inner tie rod member 36. Further, in such applications, the external threads of the outer tie rod members 38 may be opposite in pitch. As a result, the inner and outer tie rod members 36 and 38 effectively provide a turnbuckle arrangement. That is, rotation of the inner tie rod member 36 in a first direction draws the outer tie rod members 38 together. Conversely, rotation of the inner tie rod member 36 in a second, opposite direction forces the outer tie rod members 38 apart. Hence, inward and outward adjustment of the steering knuckles 22 and 24 may be selectively controlled through rotation of the inner tie rod member 36.

The tie rod assembly 16 of the present invention is further shown to include a clamp 46 associated with the outer tie rod member 38 for releasably securing the relative position of the inner tie rod member 36 and the outer tie rod member 38. The clamp 46 is preferably shown to have a C-shape with first and second spaced apart ends 48 and 50. The clamp 46 circumferentially surrounds the inner tie rod member 36. A bolt 51 passes through cooperating apertures in the first and second ends 48 and 50 and is retained by a nut 52. Upon tightening of the nut 52, the first and second ends 48 and 50 of the clamp 46 are brought together, thereby imparting a clamping force on the inner tie rod member 36. This clamping force effectively reduces the diameter of the inner tie rod member 36 by reducing the width of an elongated slot 53.

With the exception of its mounting to the tie rod assembly 16, the steering damper 14 is conventional both in construction and function. In this regard, the steering damper includes first and second telescopically related parts 58 and 60 which cooperate to absorb road input which would otherwise be transmitted to the vehicle operator through the steering wheel 30. A distal end of the first telescopic portion 58 of the steering damper 14 includes a mounting portion 61 secured to the axle assembly 18 through a mounting bracket 63 (shown in FIG. 2) in a conventional manner.

To provide means for attaching the steering damper 14 to the tie rod assembly 16, the steering linkage arrangement 10 of the present invention includes a mounting member 62 shown to have a generally C-shape with first and second spaced apart ends 64 and 66. The mounting member 62 circumferentially surrounds the inner tie rod member 36. A bolt 68 is used to secure the mounting member 62 to a mounting portion 70 provided at the distal end of the second telescopic portion 60 of the steering damper 14.

Figure 7:
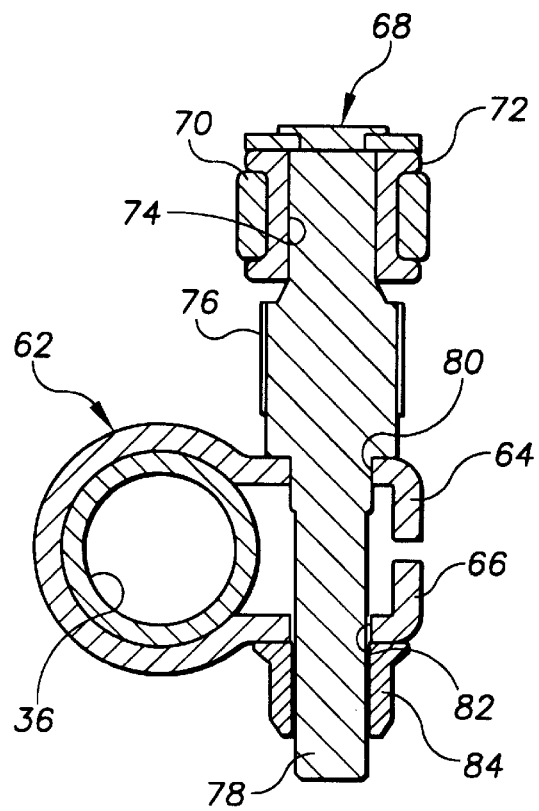
FIG. 7 is a cross-sectional view taken along the line 7—7 of FIG. 5.

As shown most particularly in FIG. 7, the bolt 68 includes an upper portion 72 which passes through an aperture 74 provided in the mounting portion 70 of the steering damper 14. A central portion 76 of the fastener 68 is enlarged and generally hexagonal in shape. A lower portion 78 of the fastener 68 passes through apertures 80 and 82 provided in the first and second ends 64 and 66, respectively, of the mounting member 62. A nut 84 threadably engages the lower end 78 of the fastener 68. The enlarged hexagonal portion 76 of the fastener 68 provides a tool gripping portion for rotating the bolt 68 and also provides for a predetermined spacing between the steering damper 14 and the tie rod assembly 16.

In the preferred embodiment, the inner tie rod member 36 of the tie rod assembly 16 includes a reduced diameter portion 88. The reduced diameter portion 88 is inwardly spaced from an adjacent end 90 of the inner tie rod member 36 and has a length approximately equal to the width of the mounting member 62. The reduced diameter portion 88 functions to positively locate the mounting member 62 along the length of the inner tie rod member 36 and thereby properly position the steering damper 14 between the tie rod assembly 16 and the axle assembly 18 upon final vehicle assembly. In the preferred embodiment, the reduced diameter portion 88 is swaged into the inner tie rod member 36.

The reduced diameter portion 88 of the inner tie rod member 36 permits the steering damper 14 to be positively located with respect to the tie rod assembly 16 while allowing for adjustment of the inner and outer tie rod members 36 and 38. That is, prior to complete tightening of the bolt 68 the bracket member 62 is positively located within the reduced diameter portion 88. However, the inner tie rod member 36 can rotate relative to the mounting member 62.

With reference now to FIG. 8, an alternative construction of an end of the inner tie rod member 36 of the present invention is illustrated. As with the inner tie rod 36 member discussed above, the inner tie rod member 36 includes a reduced diameter portion 88 for positively locating the mounting member 62. In the alternative embodiment, the reduced diameter portion 88 is positioned closer to the end 90 of the inner tie rod member 36 and the elongated slot 53 extends through at least a portion of the reduced diameter portion 88. With this alternative construction, the clamp 46 can be eliminated and the mounting member 62 performs the dual functions of attaching the steering damper 14 to the tie rod assembly and clamping the inner tie rod member 36 to the outer tie rod member 38.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof.

Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A steering linkage arrangement for a motor vehicle, the steering linkage arrangement comprising:
   an axle assembly;
   a tie rod assembly having a tubular member; and
   a steering damper having a first end connected to said axle assembly and a second end connected to a mounting member;
   said tubular member being integrally formed to include a portion for positively locating said mounting member along the length of said tubular member while permitting rotation of said tubular member relative to said mounting member.

2. The steering linkage arrangement for a motor vehicle of claim 1, wherein said tie rod assembly includes an outer tie rod member telescopically received within a tubular inner tie rod member, said mounting member being connected to said tubular inner tie rod member.

3. The steering linkage arrangement for a motor vehicle of claim 1, wherein said tubular member includes a reduced diameter portion for positively locating said mounting member thereon.

4. The steering linkage arrangement for a motor vehicle of claim 3, wherein said mounting member includes a mounting member circumferentially surrounding said reduced diameter portion.

5. The steering linkage arrangement for a motor vehicle of claim 4, wherein said mounting member includes first and second spaced apart ends formed to include first and second apertures, respectively, for receiving a fastener, said fastener operative to draw said first and second spaced apart ends together and thereby secure said mounting bracket to said tubular member.

6. The steering linkage arrangement for a motor vehicle of claim 1, wherein:
   said tie rod assembly includes an outer tie rod member telescopically received within a tubular inner tie rod member, said mounting member being connected to said tubular inner tie rod member;
   said inner tie rod member includes a reduced diameter portion for positively locating said mounting member thereon;
   said mounting member includes a mounting bracket circumferentially surrounding said reduced diameter portion; and
   said inner tie rod member includes a longitudinally extending slot disposed at an end of said inner tie rod member and longitudinally spaced from said reduced diameter portion;
   said steering linkage arrangement further including a clamp circumferentially surrounding said end of said inner tie rod member, said clamp operative to reduce a width of said longitudinally extending slot and thereby clamp said inner tie rod member relative to said outer tie rod member.

7. The steering linkage arrangement for a motor vehicle of claim 1, wherein:
   said tie rod assembly includes an outer tie rod member telescopically received within a tubular inner tie rod member, said mounting member being connected to said tubular inner tie rod member; and
   said inner tie rod member includes a longitudinally extending slot disposed at an end of said inner tie rod member and extending at least partially through said reduced diameter portion;
   said mounting member being operative to reduce a width of said longitudinally extending slot and thereby clamp said inner tie rod member relative to said outer tie rod member.

* * * * *